（12）United States Patent
Saperton

(10) Patent No.: US 11,533,999 B2
(45) Date of Patent: Dec. 27, 2022

(54) SEAT PLATE GAS CYLINDER QUICK-RELEASE DEVICE

(71) Applicant: B&Z Productions, LLC, Phoenix, AZ (US)

(72) Inventor: Michael S. Saperton, Phoenix, AZ (US)

(73) Assignee: B&Z Productions, LLC

( * ) Notice: Subject to any disclaimer, the term of this patent is extended or adjusted under 35 U.S.C. 154(b) by 0 days.

(21) Appl. No.: 17/389,666

(22) Filed: Jul. 30, 2021

(65) Prior Publication Data

US 2022/0034346 A1  Feb. 3, 2022

Related U.S. Application Data

(60) Provisional application No. 63/059,120, filed on Jul. 30, 2020.

(51) Int. Cl.
*A47C 4/02* (2006.01)
*A47C 3/30* (2006.01)
*F16B 9/00* (2006.01)

(52) U.S. Cl.
CPC ............... *A47C 4/02* (2013.01); *F16B 9/05* (2018.08); *A47C 3/30* (2013.01)

(58) Field of Classification Search
CPC ..... A47C 4/02; A47C 3/30; F16B 9/05; F16B 2/185
USPC ..................... 248/535, 539, 229.13
See application file for complete search history.

(56) References Cited

U.S. PATENT DOCUMENTS

| 2,703,691 | A | | 3/1955 | Minnis |
| 3,788,587 | A | | 1/1974 | Stemmier |
| 3,790,119 | A | | 2/1974 | Bauer |
| 3,820,844 | A | | 6/1974 | Fortnam |
| 3,891,270 | A | | 6/1975 | Crossman et al. |
| 4,283,033 | A | | 8/1981 | Bauer |
| 4,573,717 | A | * | 3/1986 | Peacock ............... F16B 2/185 24/270 |
| 4,580,749 | A | | 4/1986 | Howard |

(Continued)

FOREIGN PATENT DOCUMENTS

| CN | 2412830 Y | 1/2001 |
| CN | 2758163 | 2/2006 |

(Continued)

OTHER PUBLICATIONS 5 page Written Opinion of PCT/US2021/052979, dated Jan. 14, 2022. (Year: 2022).*

*Primary Examiner* — Robert Canfield
(74) *Attorney, Agent, or Firm* — Thomas W. Galvani, P.C.; Thomas W. Galvani

(57) ABSTRACT

A quick-release device for securing a gas cylinder in a seat plate includes a pedestal defining a socket for receiving the gas cylinder. The pedestal projects upwardly from an endwall to form a jaw against which the gas cylinder is received when applied to the socket. A clamp is pivoted to the jaw for movement between an open position and a closed position. A flange is formed in the pedestal and has a lower surface for confrontation with the seat plate. A latch is coupled to the pedestal. The latch moves between a first position enabling movement of the clamp between the open and closed positions, and a second position disabling movement of the clamp between the open and closed positions.

18 Claims, 13 Drawing Sheets

(56) References Cited

U.S. PATENT DOCUMENTS

| | | |
|---|---|---|
| 4,623,195 A | 11/1986 | Avella |
| 4,643,460 A * | 2/1987 | Lieberg .................. F16L 17/04 |
| | | 285/365 |
| 4,905,951 A | 3/1990 | Putness |
| 4,979,718 A | 12/1990 | Bauer et al. |
| 5,295,933 A * | 3/1994 | Ciminski ........... A63B 21/0728 |
| | | 403/17 |
| 5,476,020 A | 12/1995 | Garvey et al. |
| 5,740,997 A | 4/1998 | Wieran |
| 5,882,076 A | 3/1999 | Garelick et al. |
| 6,004,064 A | 12/1999 | Franz |
| 6,012,775 A | 1/2000 | Czarnecki |
| 6,022,077 A | 2/2000 | Kirkland et al. |
| 6,030,037 A | 2/2000 | Ritch et al. |
| 6,082,680 A | 7/2000 | Woodward et al. |
| 6,116,183 A | 9/2000 | Crow et al. |
| 6,142,571 A | 11/2000 | Benden |
| 6,607,246 B1 | 8/2003 | Benden |
| 6,695,407 B1 | 2/2004 | Lin |
| 6,941,621 B1 | 9/2005 | Wolforth et al. |
| 7,451,958 B2 | 11/2008 | Ritter et al. |
| 7,452,034 B2 | 11/2008 | Jung |
| 7,938,377 B2 | 5/2011 | Draghici et al. |
| 8,052,218 B2 | 11/2011 | Grove |
| 8,075,056 B2 | 12/2011 | Glockl et al. |
| 8,246,118 B2 | 8/2012 | Moore |
| 8,827,216 B2 | 9/2014 | Brown et al. |
| 8,888,184 B2 | 11/2014 | Meyer et al. |
| 8,888,398 B2 | 11/2014 | Werth |
| 8,979,050 B2 | 3/2015 | Yu |
| 9,578,969 B1 | 2/2017 | Su |
| 9,642,465 B1 | 5/2017 | Park |
| 9,706,849 B2 | 7/2017 | Su |
| 10,051,930 B2 * | 8/2018 | Heim ....................... A45B 9/00 |
| 10,260,671 B2 | 4/2019 | James et al. |
| 10,772,432 B2 | 9/2020 | Park et al. |
| 10,794,529 B2 | 10/2020 | James et al. |
| D905,805 S * | 12/2020 | Muir ............................ D21/694 |
| 11,045,002 B1 | 6/2021 | Saperton |
| 2001/0030269 A1* | 10/2001 | Evans .................... F16M 13/02 |
| | | 248/231.51 |
| 2002/0106237 A1* | 8/2002 | Rogers ...................... E04G 7/14 |
| | | 403/49 |
| 2003/0151291 A1 | 8/2003 | Lin et al. |
| 2005/0275254 A1* | 12/2005 | Anderson .................. B62J 1/08 |
| | | 297/195.1 |
| 2006/0043245 A1 | 3/2006 | Baker et al. |
| 2006/0214489 A1 | 9/2006 | Cheng |
| 2007/0102979 A1 | 5/2007 | Tedesco |
| 2008/0219760 A1* | 9/2008 | Wu ......................... F16B 2/185 |
| | | 403/322.4 |
| 2009/0208277 A1 | 8/2009 | Werth |
| 2013/0038109 A1 | 2/2013 | Chi |
| 2014/0271036 A1 | 9/2014 | Emmerich |
| 2017/0144012 A1* | 5/2017 | Stilson ............... A63B 21/0728 |
| 2017/0350552 A1* | 12/2017 | James .................. F16M 11/041 |
| 2019/0249819 A1 | 8/2019 | James et al. |
| 2019/0269248 A1 | 9/2019 | Beloff |
| 2019/0339037 A1* | 11/2019 | Burton ...................... F16B 2/10 |
| 2019/0344853 A1* | 11/2019 | Schoch ................ F16M 13/022 |
| 2019/0383431 A1* | 12/2019 | Magagna ................ F16L 33/06 |
| 2021/0001165 A1* | 1/2021 | Stilson ............... A63B 21/0728 |
| 2021/0370335 A1* | 12/2021 | Im .......................... A62C 35/68 |

FOREIGN PATENT DOCUMENTS

| | | |
|---|---|---|
| CN | 101549735 A | 10/2009 |
| CN | 210204050 U | 3/2020 |
| GB | 2120088 A | 11/1983 |
| JP | H1037570 A | 2/1998 |
| JP | 2895447 B2 | 5/1999 |
| JP | 2008132298 A | 6/2008 |
| WO | 2009084915 A1 | 7/2009 |

\* cited by examiner ated U.S. Patent No. 11,533,999 B2

SEAT PLATE GAS CYLINDER QUICK-RELEASE DEVICE

CROSS-REFERENCE TO RELATED APPLICATIONS

This application claims the benefit of U.S. Provisional Application No. 63/059,120, filed Jul. 30, 2020, which is hereby incorporated by reference.

FIELD

The present specification relates generally to furniture, and more particularly to devices for assembling and disassembling furniture quickly and easily.

BACKGROUND

In the exhibitor and conference industry, office furniture is repeatedly transported in trucks, unpacked, set up, used, and then packed back into the trucks for transportation to a warehouse or other storage facility. Some pieces of furniture—conference tables, media screens, speakers, etc.—are fairly easy to pack; they can be laid flat, rolled up, or packed into road cases and then placed into the truck. Items such as these may be densely packed because they are either large and heavy or small.

Some types of furniture, such as office chairs, salon and cosmetology chairs and table tops, present packing issues. Table tops generally must be completely dismantled or broken down. Office chairs are relatively light but are quite large and cumbersome. They usually cannot be laid flat, rolled up, or packed into a box. Most office chairs cannot be disassembled. Almost all office chairs have a seat back and a seat bottom mounted on a seat plate. The seat plate connects to a gas-lift or non-gas-lift cylinder piston that is then mounted in a wheelbase. Moreover, tall draft chairs usually have footrest rings or split rings mounted on the gas-lift cylinder piston. None of the pieces are separable from the chair in the conventional art.

At least one invention, disclosed in U.S. Pat. No. 10,260,671 entitled Gas Cylinder Quick Release Device, describes devices for separating the gas cylinder piston (also known simply as a "gas cylinder") from the seat bottom and from the wheelbase. Gas cylinders typically have an external sleeve and a rod which reciprocates in the sleeve. The rod is usually directed upward while the sleeve is downward, such that the rod is press fit into the seat plate and the sleeve is press fit into the wheelbase. A fastened socket in the seat plate receives the rod, and a socket—generally a circular hole—in the wheelbase receives the sleeve. When the chair is assembled in this fashion and a user sits in the chair, the rod and sleeve further press into the seat plate and the wheelbase, setting the gas cylinder securely. Over just a few hours, the gas cylinder is driven into a firm and very secure press-fit engagement with the seat plate and the wheelbase. Over days, months, and years, the gas cylinder becomes nearly permanently seated into the seat plate and the wheelbase.

The gas cylinder is quite difficult to separate from the chair or seatplate. There are few effective means for removing the gas cylinder from the chair. While the wheelbase can sometimes be removed by hitting it off the gas cylinder with a mallet, this can obviously cause a great deal of damage to the wheelbase. Hitting the seat plate—or the gas cylinder—to try to remove the gas cylinder from the seat plate will ruin either, or potentially both. There remains a need for a safe, easy, and effective way to decouple or remove the gas cylinder from the seat plate.

SUMMARY

An embodiment of a quick-release device for securing a gas cylinder in a seat plate includes a pedestal defining a socket for receiving the gas cylinder. The pedestal projects upwardly from an endwall to form a jaw against which the gas cylinder is received when applied to the socket. A clamp is pivoted to the jaw for movement between an open position and a closed position. A flange is formed in the pedestal and has a lower surface for confrontation with the seat plate. A latch is coupled to the pedestal. The latch moves between a first position enabling movement of the clamp between the open and closed positions, and a second position disabling movement of the clamp between the open and closed positions. The clamp is pivoted to the pedestal above the flange. The endwall of the pedestal includes a central hole formed through the endwall at a geometric center thereof. The latch includes a cam and a handle extending therefrom. A bolt is carried in the jaw, and the latch is coupled to the bolt to move in pivotal movement between the first and second positions. The pedestal further includes a stem below the flange, and the stem configured to be inserted into the seat plate to be secured therein. In the closed position of the clamp, and when the gas cylinder is received in the socket, the clamp bears the gas cylinder in confrontation against the jaw. In the open position of the clamp, and when the gas cylinder is received in the socket, the clamp releases the gas cylinder from confrontation against the jaw.

In an embodiment, a quick-release device for securing a gas cylinder in a seat plate includes a pedestal having a cylindrical stem and a semi-cylindrical jaw projecting above the stem, and a socket defined therein to receive the gas cylinder. A clamp is pivoted to the jaw for movement between an open position and a closed position. A latch is coupled to the pedestal, which latch moves between a first position enabling movement of the clamp between the open and closed positions, and a second position disabling movement of the clamp between the open and closed positions. In the closed position of the clamp, and when the gas cylinder is received in the socket, the clamp bears the gas cylinder in confrontation against the jaw. In the open position of the clamp, and when the gas cylinder is received in the socket, the clamp releases the gas cylinder from confrontation against the jaw. A flange is formed in the pedestal, and the flange has a lower surface for confrontation with the seat plate. The clamp is pivoted to the pedestal above the flange. The pedestal further includes a stem below the flange, and the stem is configured to be inserted into the seat plate to be secured therein. The pedestal projects upwardly from an endwall, and the endwall includes a central hole formed through the endwall at a geometric center thereof. The latch includes a cam and a handle extending therefrom. A bolt is carried in the jaw, and the latch is coupled to the bolt to move in pivotal movement between the first and second positions.

In an embodiment, a quick-release device for securing a gas cylinder in a seat plate includes a pedestal defining a socket for receiving the gas cylinder. The pedestal projects upwardly to form a jaw against which the gas cylinder is received when applied to the socket. A clamp is pivoted to the jaw for movement between an open position and a closed position. A latch is coupled to the pedestal, and the latch moves between a first position enabling movement of the clamp between the open and closed positions, and a second position disabling movement of the clamp between the open and closed positions. The pedestal is formed monolithically to a base, and the base configured to be received in the seat plate. The pedestal further includes a cylinder projecting upward from the base to the jaw and to below the clamp pivoted to the jaw. A central hole is formed through the base at a geometric center of the cylinder. The latch includes a cam and a handle extending therefrom. A bolt is carried in the jaw, and the latch is coupled to the bolt to move in pivotal movement between the first and second positions.

The above provides the reader with a very brief summary of some embodiments described below. Simplifications and omissions are made, and the summary is not intended to limit or define in any way the disclosure. Rather, this brief summary merely introduces the reader to some aspects of some embodiments in preparation for the detailed description that follows.

BRIEF DESCRIPTION OF THE DRAWINGS

Referring to the drawings.

DETAILED DESCRIPTION

Figure 1:
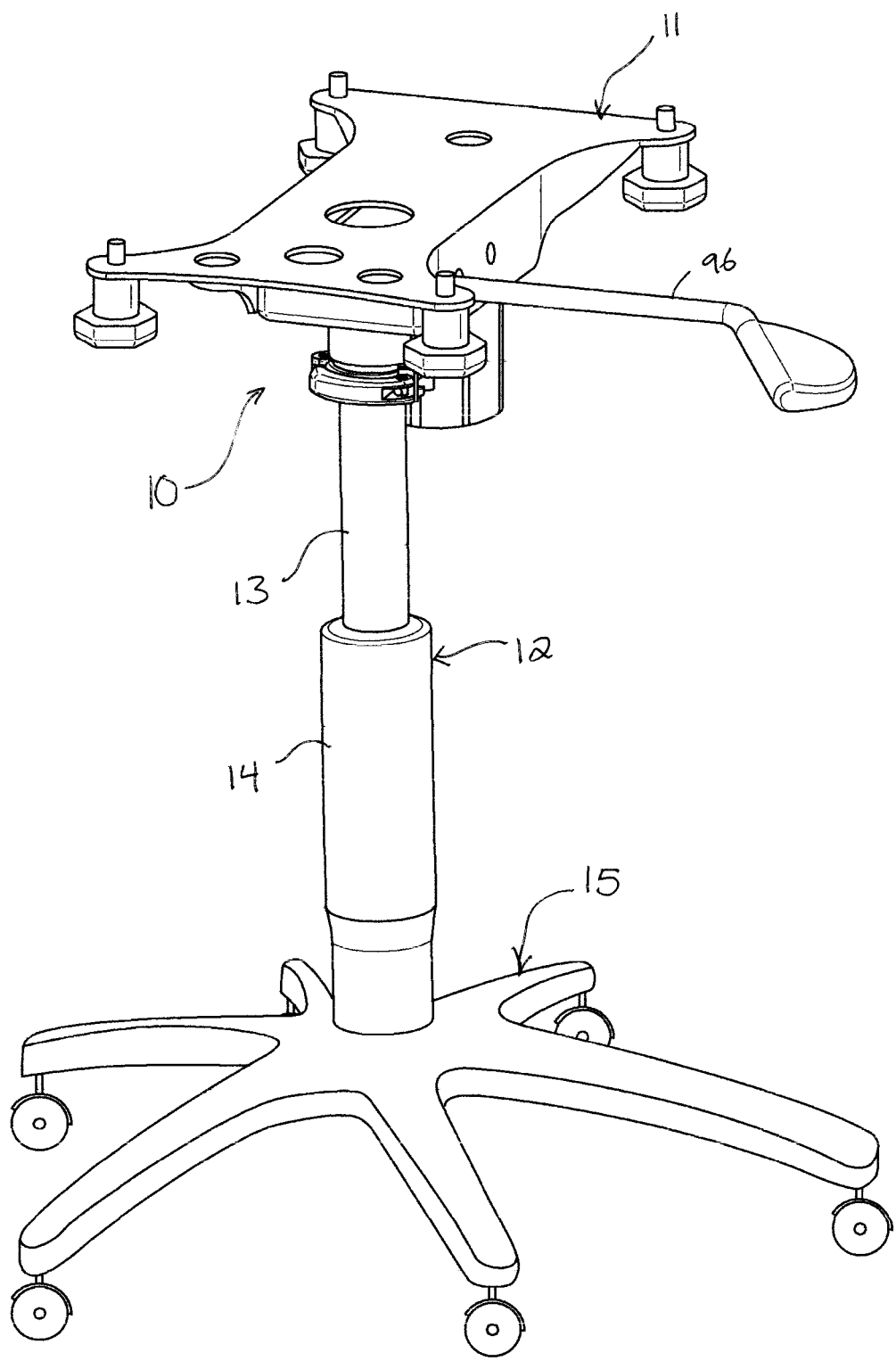
FIG. 1 is a top perspective view of a bottom of an office chair, illustrating a seat plate, a quick-release device, a gas cylinder assembly, and a wheelbase.

Reference now is made to the drawings, in which the same reference characters are used throughout the different figures to designate the same elements. Briefly, the embodiments presented herein are preferred exemplary embodiments and are not intended to limit the scope, applicability, or configuration of all possible embodiments, but rather to provide an enabling description for all possible embodiments within the scope and spirit of the specification. Description of these preferred embodiments is generally made with the use of verbs such as "is" and "are" rather than "may," "could," "includes," "comprises," and the like, because the description is made with reference to the drawings presented. One having ordinary skill in the art will understand that changes may be made in the structure, arrangement, number, and function of elements and features without departing from the scope and spirit of the specification. Further, the description may omit certain information which is readily known to one having ordinary skill in the art to prevent crowding the description with detail which is not necessary for enablement. Indeed, the diction used herein is meant to be readable and informational rather than to delineate and limit the specification; therefore, the scope and spirit of the specification should not be limited by the following description and its language choices.

FIG. 1 is a perspective view of the lower half of a chair such as an office chair, and includes a seat plate 11, a gas cylinder assembly 12 (hereinafter "gas piston" or "gas cylinder") including a rod 13 and a sleeve 14, and a wheelbase 15. The rod 13 (cylinder) is within the sleeve 14 of the gas cylinder 12 and engaged in the seat plate 11, and the bottom of the sleeve is press-fit into a wheelbase 15. A quick-release device 10 (also referred to herein simply as "the device 10") is secured to a cup of the seat plate 11 to which the rod 13 is engaged. In FIG. 1, the seat bottom and back of the chair are removed for clarity of the illustration. This specification describes a chair for convenience of the explanation, but a chair is just one exemplary device on which the device 10 is suitable for use; it can also be used with any device which incorporates a gas cylinder similar to the gas cylinder 12.

Figure 2A:
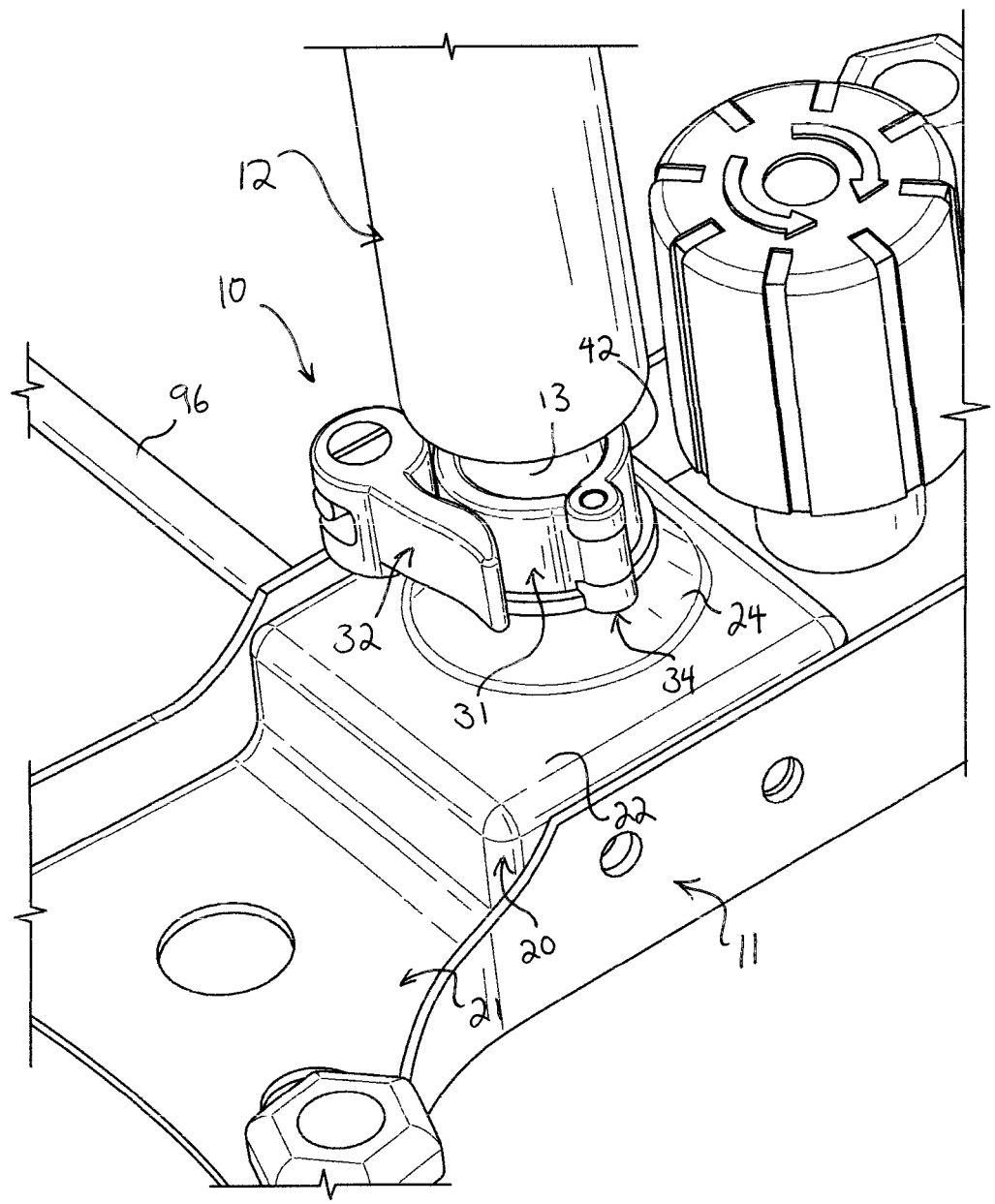
FIGS. 2A and 2B are left and right, inverted bottom perspective views of the quick-release device of FIG. 1 in the seat plate with a gas cylinder assembly applied thereto.
Figure 2B:
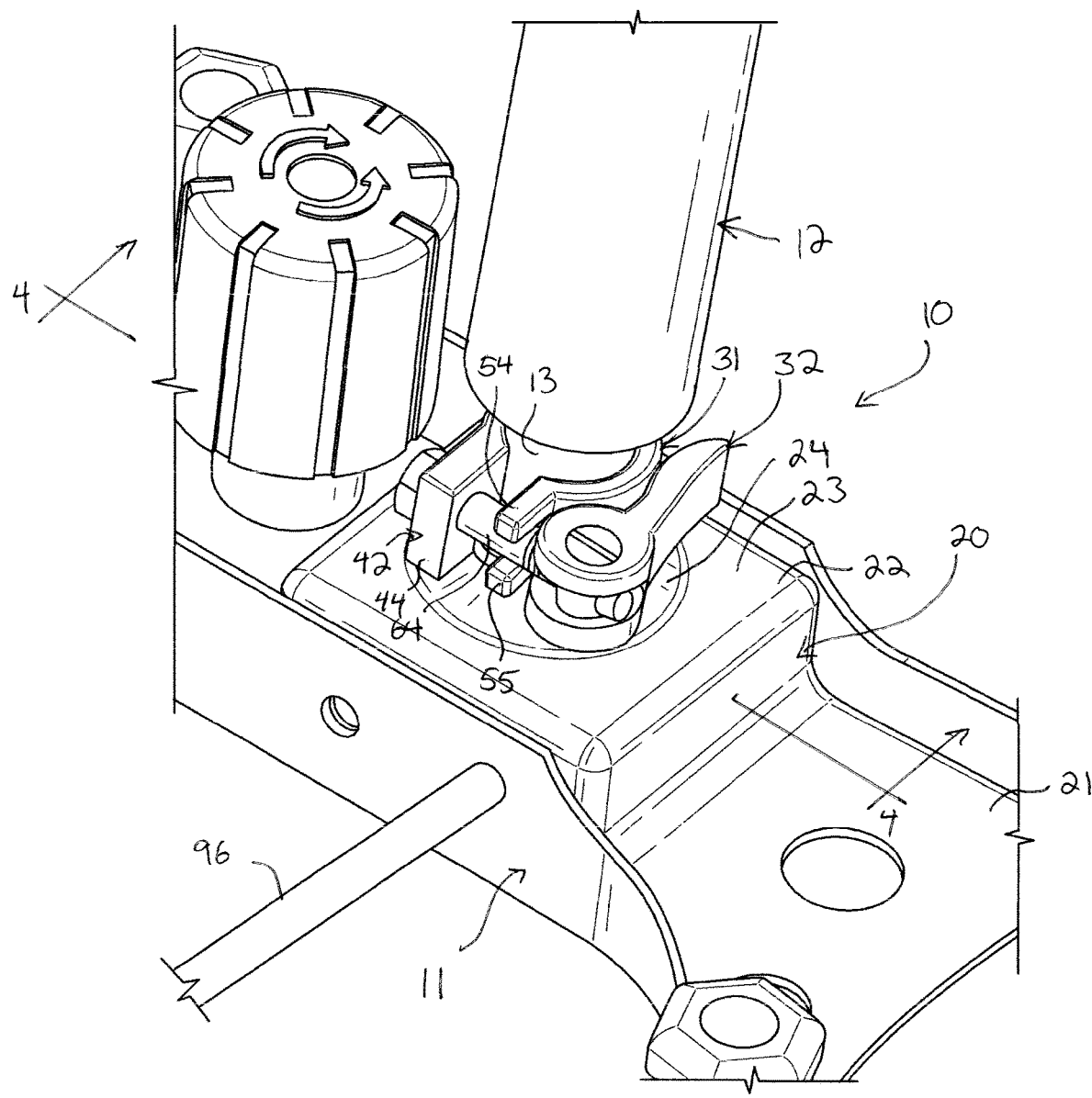

FIGS. 2A and 2B illustrate the chair in an inverted position, as if the seat bottom were resting on the ground, from both the left and right sides. The wheelbase 15 is not shown for clarity of the illustrations, nor is the seat bottom.

A base 20 is carried within the seat plate 11. The base 20 projects upwardly from the seat plate between two sides of the seat plate 11. Briefly, it is noted here that in all drawings except FIG. 1, the chair is shown in an inverted position, and so the directions of "up" and "down" and like terms are used in an inverted fashion with respect to the orientation they would take when the chair is used in an upright manner. Referring now also to the section view of FIG. 4, the base 20 is generally box-shaped; it includes a lower box 21 and a smaller upper box 22. Both the upper and lower boxes 21 and 22 have fronts and backs, and sides disposed against the sides of the seat plate 11. The upper box 22 also has a top 23 in which a cup 24 is formed. In some embodiments, the upper box has a top 23 with no cup 24. The cup 24 is a truncated cone, having a wide base 25 formed integrally to the top 23 of the upper box 22 which tapers to a narrower open mouth 26. The cup 24 is a mount for the quick-release device 10 to receive, hold, and secure the rod 13 of the gas cylinder 12. The gas cylinder 12 is placed into the device 10 at the cup 24 and becomes seated therein during use of the chair.

Figure 3:
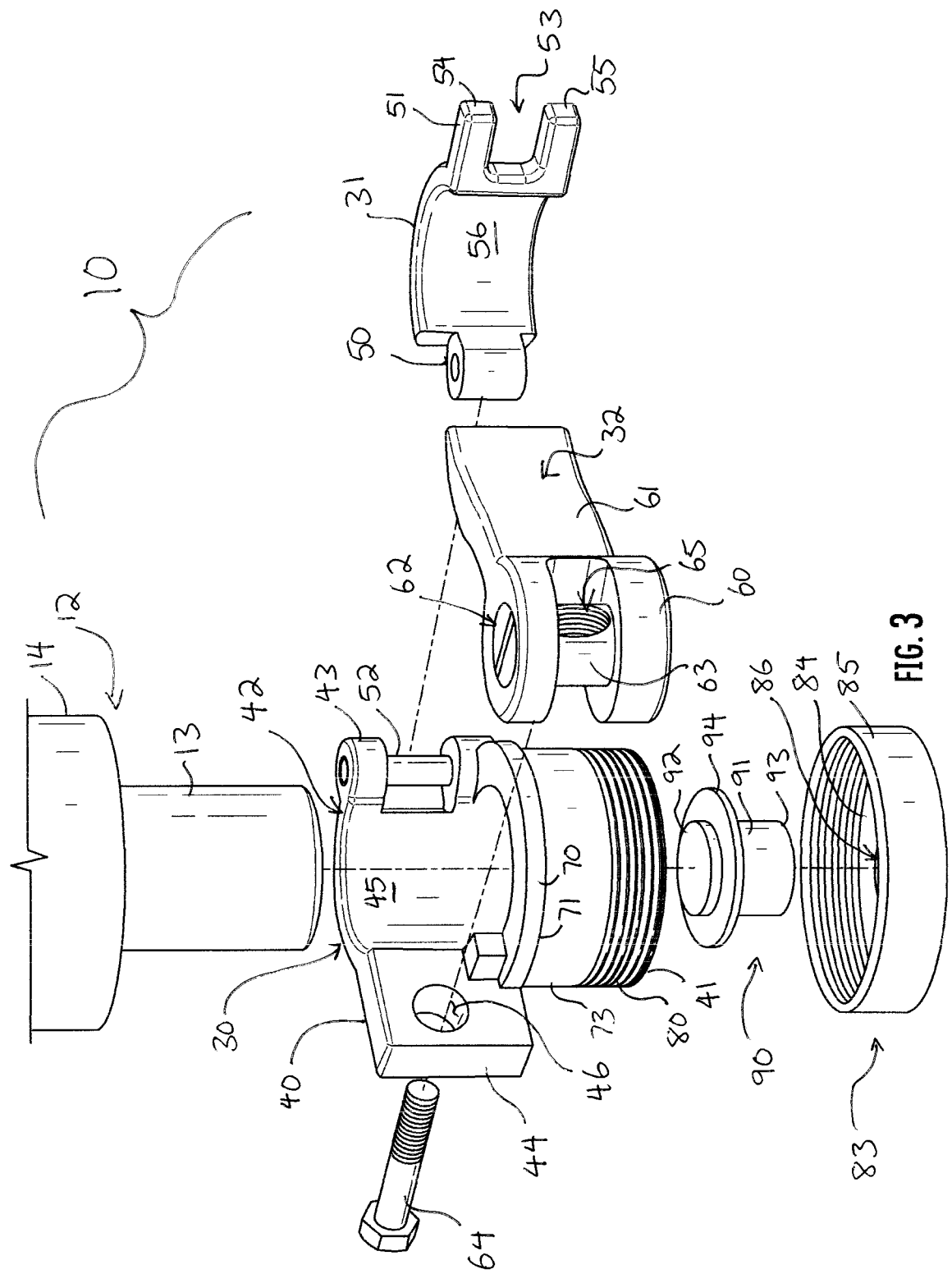
FIG. 3 is an exploded view of the quick-release device of FIG. 1.
Figure 4:
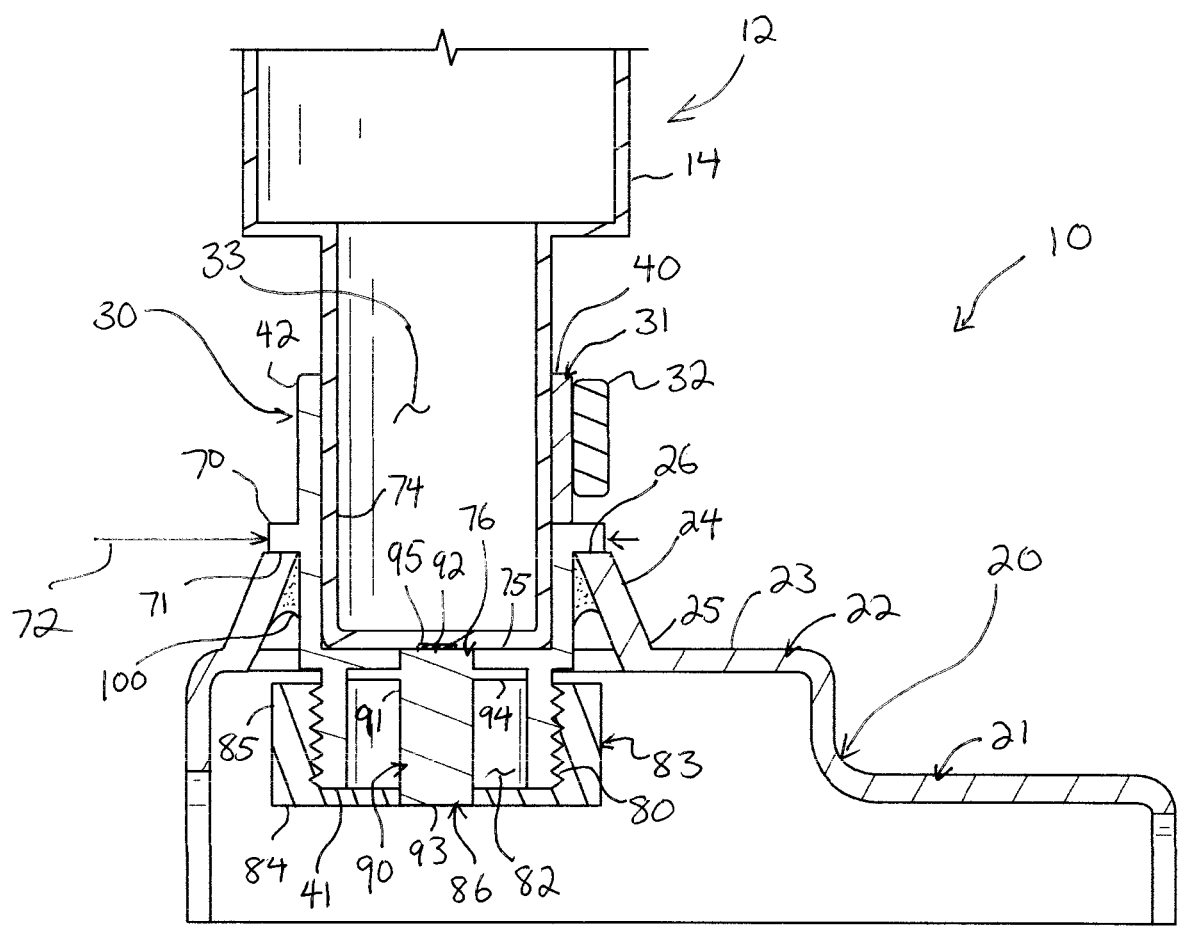
FIG. 4 is a section view taken along the line 4-4 of FIG. 2B.

Referring now primarily to FIGS. 3 and 4, the quick-release device 10 is a clamp having jaws useful for clamping onto the gas cylinder 12. The device 10 includes a roughly cylindrically-shaped pedestal 30, a clamp 31 pivoted to the pedestal 30 at a hinge 34, and a latch 32 secured over the clamp 31. The pedestal 30 and the clamp 31 are jaws, and the clamp 31 moves between closed and option conditions of the device 10. In the closed position of the clamp 31—and thus the closed condition of the quick-release device 10—the pedestal 30 and the clamp 31 bound and define an interior space or socket 33 into which the gas cylinder 12 is placed. The latch 32 mounted to the pedestal 30 to releasably couple, close, and tighten the clamp 31 with respect to the pedestal 30, so as to arrange the quick-release device 10 between the unlocked and locked conditions.

The pedestal 30 includes a top end 40 and an opposed bottom end 41. Again, the reader is reminded that these directional terms are used with respect to the orientation shown in the drawings, which are inverted from the orientation in which the chair and the device 10 are actually used. The top end 40 may be considered a first end and the bottom end 41 a second end. Proximate the top end 40, the pedestal 30 includes a jaw 42. The jaw 42 has a roughly semi-cylindrical sidewall with opposed ends 43 and 44. The end 43 is a knuckle forming a portion of the hinge 34. The opposed end 44 is flat, having a medial hole 46 extending longitudinally through the end 44.

The jaw 42 includes an inner surface 45 which is arcuate and defines an inner diameter of the jaw 42. The inner diameter of the jaw 42 is just slightly less than the outer diameter of the rod 13. As such, when the quick-release device 10 is moved into the closed condition around the rod 13, the outer diameter of the rod 13 is tightly received in contact against the inner surface 45 of the jaw 42.

The clamp 31 is pivoted to the jaw 42. The clamp 31 has opposed ends 50 and 51. The end 50 is a knuckle forming the portion of the hinge 34 complemental to the knuckled end 44 of the jaw 42, and the end 51 is a free end. A pin 52 is passed through bores formed through the ends 43 and 50 to bind the knuckled ends 43 and 50 of the jaw 42 and the clamp 31 to each other and form the hinge 34.

The clamp 31 has a roughly semi-cylindrical sidewall extending from the end 50 to the end 51. The end 51 is forked, having a medial slot 53 extending longitudinally into the clamp 31. The slot 53 receives the latch 32 to close the clamp 31 to the jaw 42. The slot 53 severs the free end 52 into opposed upper and lower tangs 54 and 55. The clamp 31 includes an inner surface 56 which is arcuate and defines an inner diameter of the clamp 31. The inner diameter of the clamp 31 is just slightly less than the outer diameter of the rod 13. As such, when the quick-release device 10 is moved into the closed condition around the rod 13, the outer diameter of the rod 13 is tightly received in contact against the inner surface 56 of the clamp 31. Further, when the clamp 31 is in the closed position thereof, the tangs 54 and 55 confront or are brought close to the end 44 of the jaw 42.

The clamp 31 is secured by the latch 32 coupled to the jaw 42. The latch 32 includes a cam 60 and a handle 61 formed integrally and monolithically to the cam 60, but extending away from the cam 60. The cam 60 and handle 61 together define the latch 32. The cam 60 is formed with a bore 62 extending entirely through the cam 60 transverse to the handle 61. The bore 62 holds a pin 63, about which the cam 60 and handle 61 are mounted for rotation. The bore 62 is eccentrically disposed in the cam 60; that is, the bore 62 is offset with respect to the geometric center of the cam 60.

The pin 63 has a threaded hole 65 to which the end of a bolt 64 is mounted with a threaded engagement. The bolt 64 is passed through the hole 46 in the end 44 of the jaw 42 and is prevented from passing through the hole 46 in a forward direction by an enlarged head of the bolt 64. The pin 63 can be rotated in one direction or another to thread the pin 63 more or less onto the bolt 64 and thereby translate the pin 63 down or up the bolt 64 slightly, so as to change the effective length of the bolt 64 slightly. With the pin 63 mounted on the bolt 64, the cam 60 and the handle 61 pivot with respect to the bolt 64 through a wide range of movement.

Because the bore 62 of the cam 60 is eccentrically formed, the cam 60 itself is an eccentric: as the handle 61 is rotated about the pin 63, the cam presents 60 a lesser or greater wall thickness along the direction of the bolt 64. In other words, as the handle 61 rotates, pin 63 is moved slightly closer to or further from the pin 63, shortening an effective length of the bolt 64 with which the clamp 31 can be captured. When the clamp 31 is in the closed position, the bolt 64 is passed through the slot 54 between the tangs 54 and 55 and is captured therein.

The above describes the structure for capturing and securing the gas cylinder 12 with respect to the pedestal 30. The pedestal 30 further includes structure which secures the pedestal 30 with respect to the seat plate. Referring to FIGS. 3 and 4, the jaw 42 of the pedestal 30 is a backstop projecting upwardly from a flange 70. The flange 70 has a lower surface 71 and an outer diameter 72 which is greater than the outer diameter of the remainder of the pedestal 30. A stem 73 depends below the flange 70. The stem 73 has a cylindrical sidewall 74 which has the same inner diameter defined by the jaw 42; the length of the sidewall 74 can vary depending on the size of the base 20. The sidewall 74 extends upward past the flange to define the jaw 42, and the inner diameter of the pedestal 30 is constant from the jaw 42 to the bottom of the stem 73. The stem 73 has an outer diameter which is less than the outer diameter 72 of the flange 70, such that the stem 73 is reduced with respect to the flange 70. Therefore, the lower surface 71 of the flange defines an abutment surface against which the pedestal 30 is received by the cup 24 of the base 20.

The stem 73 terminates at an endwall 75 toward the bottom end 41 of the pedestal 30. The endwall 75 is directed laterally, approximately ninety degrees with respect to the sidewall 74, extending radially inward to a central hole 76. The central hole 76 is a throughbore in the endwall 75 at or near the geometric center of the endwall 75. The endwall 75, and the central hole 76 formed therein, prevents the rod 13 from fully seating in the device 10, so that a pin 95 on the gas cylinder 12 will continue to operate, as described below.

Depending from the endwall 75 is a collar 80. The collar 80 is an annular sidewall projecting downward from the endwall 75 to the bottom end 41 of the pedestal 30, where it terminates at a bottom 81. The bottom 81, the collar 80, and the endwall 75 cooperate to bound and define a hold 82 within the collar 80. The collar 80 has externally-directed threads on the outer surface of the collar 80, to which a cap 83 engages.

The cap 83 is threadably engaged over the collar 80 to nearly enclose the hold 82. The cap 83 includes an endwall 84 and an annular upstanding sidewall 85 projecting above the endwall 84. A central hole 86 is formed at or near the geometric center of the endwall 84. The inner surface of the sidewall 85 carries internally-directed threads which are complemental to the threads on the collar 80. The cap 83 thus may be threadably engaged to and removed from the collar 80.

A button 90 is carried within the hold 82. The button 90 is an extension to engage the gas cylinder 12. The button 90 includes a central cylindrical shank 91 with opposed upper and lower ends 92 and 93. A thin flange 94 projects radially outward from the shank 91 proximate the upper end 92 thereof. The flange 94 has an outer diameter corresponding to the inner diameter of the collar 80, such that button 90 fits snugly within the collar 80. The upper end 92 of the button 90 is cylindrical and has an outer diameter corresponding to the central hole 76 in the endwall 75 of the stem 73, such that the upper end 92 is sized and shaped to translate into and out of the central hole 76. Likewise, the lower end 93 of the button 90 is cylindrical and has an outer diameter corresponding to the central hole 86 in the endwall 84 of the cap 83, such that the lower end 93 is sized and shaped to translate into and out of the central hole 86. The button 90 is thus carried in the hold 82 for reciprocation between an advanced position and a retracted position. In some embodiments, the flange 94 may be thicker or there may be a second flange to prevent the button 90 from tilting within the collar 80 during reciprocation. In the retracted position, the lower end 93 passes through and projects out of the central hole 86 in the endwall 84 of the cap 83, where it is available to be depressed by a lever 96 (shown in FIG. 2A). The lever 96 projects over to the side of the chair so that it can be grabbed by the chair's user and manipulated to alter the height of the seat. When the lever 96 is pressed against the lower end 93 of the button 90, the button 90 translates upward and the upper end 92 projects through the central hole 76 in the endwall 75 of the stem 73. Gas cylinders similar to the gas cylinder 12 often include a button or pin 95 at the end of the rod 13 which enables and disables translation of the rod 13 within the sleeve 14. When the button 90 translates upward it impacts the pin 95, so that the rod 13 may be moved within the sleeve 14. Therefore, the button 90 acts as an extension to the pin 95 to enable and disable translation of the rod 13.

In operation, the quick-release device 10 is useful to securely secure the gas cylinder 12 with respect to the cup 24. The quick-release device 10 can be opened to remove the gas cylinder 10 from the cup 24 when the chair, table, or furniture item is ready to be packed up and transported. FIGS. 1-4 illustrate the device 10 in a closed condition. The following discussion describing how to remove the quick-release device 10 is made with respect to FIGS. 2B, 4, and 5A-5C.

FIGS. 2B and 4 show the pedestal 30 applied to the cup 24. The pedestal 30 is partially inserted into the base 20 through the open mouth 26 of the cup 24. The pedestal 30 is disposed in confronting relation with the cup 24, with the lower surface 71 of the flange 70 in confrontation with the mouth 26 of the cup 24, thereby firmly seating the pedestal 30 in the cup 24. So seated, the stem 73 extends into the base 20 and is encircled by the cup 24, and the collar 80 projects into the upper box 22 and slightly into the lower box 21 of the base 20. When the cap 83 is threadably engaged to the collar 80, the pedestal 30 cannot be removed from the base 20; the outer diameter of the cap 83 is larger than the inner diameter of the open mouth 26 of the cup 24. The pedestal 30 is secured in the cup by a weld 100 between the inner surface of the cup 24 and the outer surface of the sidewall 74 of the stem 73. The weld 100 is shown in FIG. 4.

Preferably, during the assembly and installation process, the pedestal 30 is inserted through the open mouth 26 of the cup 24 until the flange 70, which has an outer diameter 72 larger than the open mouth 26, confronts the mouth 26 and prevents further insertion of the pedestal 30 into the cup 24. A welder then forms the weld 100 between the cup 24 and the stem 73 to secure the pedestal 80 in the base. Then, the button 90 is applied to the hold 82 within the collar 80, and the cap 83 is threadably engaged to the collar 80.

FIG. 2B shows the latch 32 and the quick-release device 10 in the closed condition. The handle 61 of the latch 32 is directed along the outer surface of the clamp 31. In this position of the handle 61, the cam 60 pushes the tangs 54 and 55 of the clamp 31 toward the end 44 of the jaw 42. Because the jaw 42 is fixed as part of the pedestal 30, and because the clamp 31 pivots with respect to the jaw 42 about the hinge 34, placing the handle 61 into the closed position moves the clamp 31 toward the jaw 42. Again, this is because the cam 60 is an eccentric: as the handle 61 is moved into the closed position, the cam 60 rotates to present a greater wall thickness along the direction of the bolt 64. This shortens the effective length of the bolt 64, that is, the length of the bolt 64 from the end 44 of the jaw 42 onto which the free end 51 of the clamp 31 can be fit. This draws the clamp 31 closer to the jaw 42, thereby constricting the quick-release device 10 about the rod 13 of the gas cylinder 12. Because the jaw 42 and clamp 31 have inner diameters just slightly less than the outer diameter of the rod 13, this clamps the gas cylinder 12 tightly into the device 10. With the pedestal 30 secured by the weld 100 to the base 20, and the rod 13 secured by the quick-release device 10 to the pedestal 30, the gas cylinder 12 is firmly secured in the seat plate 11.

To remove the gas cylinder 12 from the seat plate 11, the chair, table, or furniture item is inverted. Then, and with reference to FIG. 5A, the handle 61 is taken up, such as by hand, and moved away from the clamp 31, along the pivotal direction of the arcuate arrowed line A in FIG. 5A. Pivoting the handle 61 about the pin 63 at the end of the bolt 64 allows the tangs 54 and 55 at the end 51 of the clamp 31 to move slightly away from the end 44 of the jaw 42. This loosens the jaw 42 and the clamp 31 with respect to the rod 13. The handle 61 is moved until it is at least aligned with the bolt 64. At this position of the handle 61, the latch 32 can be rotated on the threaded end of the bolt 64.

Figure 5A:
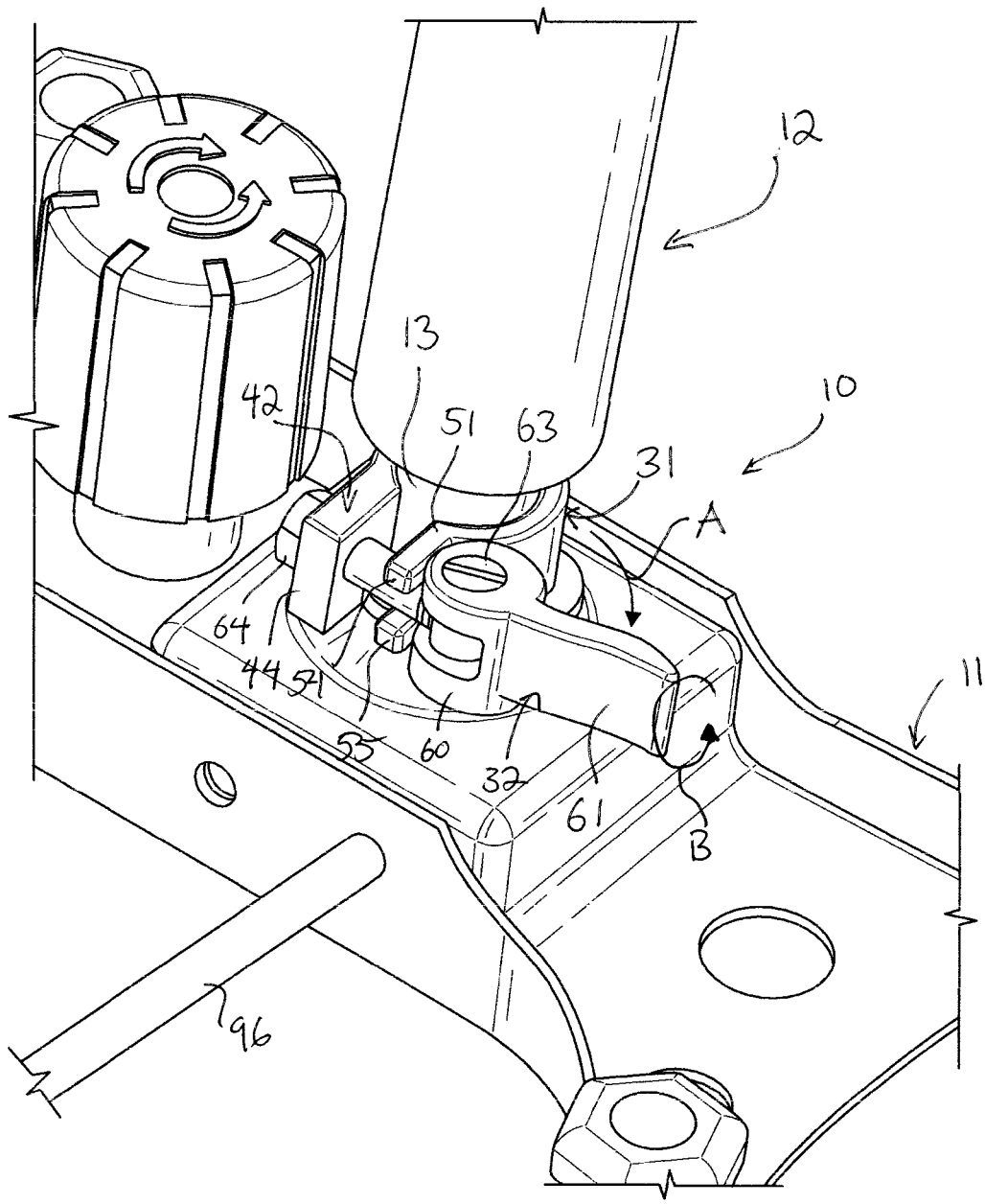
FIGS. 5A-5C are perspective views showing steps of removing the gas cylinder assembly from the quick-release device of FIG. 1.

The latch 32 is rotated counter-clockwise along the circular line B in FIG. 5A (or the bolt 64 is rotated clockwise while the latch 32 is held stationary), causing the pin 63 in the cam 60 to threadably disengage from the threaded end of the bolt 64. This increases the effective length of the bolt 64 and allows the clamp 31 to move further away from the jaw 42. The latch 32 is loosened until the clamp 31 can be swung out; in some cases this may require that the latch 32 be completely removed from the bolt 64. In other embodiments, the bolt 64 is pivoted within the end 44 of the clamp 42, and can be pivoted away from the rod 13 to move the latch 61. In still other embodiments, it is only necessary to swing the latch 32 out along line 32 to release the compression of the jaw 31 against the rod 13, and it is not necessary to loosen the latch 32 by spinning it.

Figure 5B:
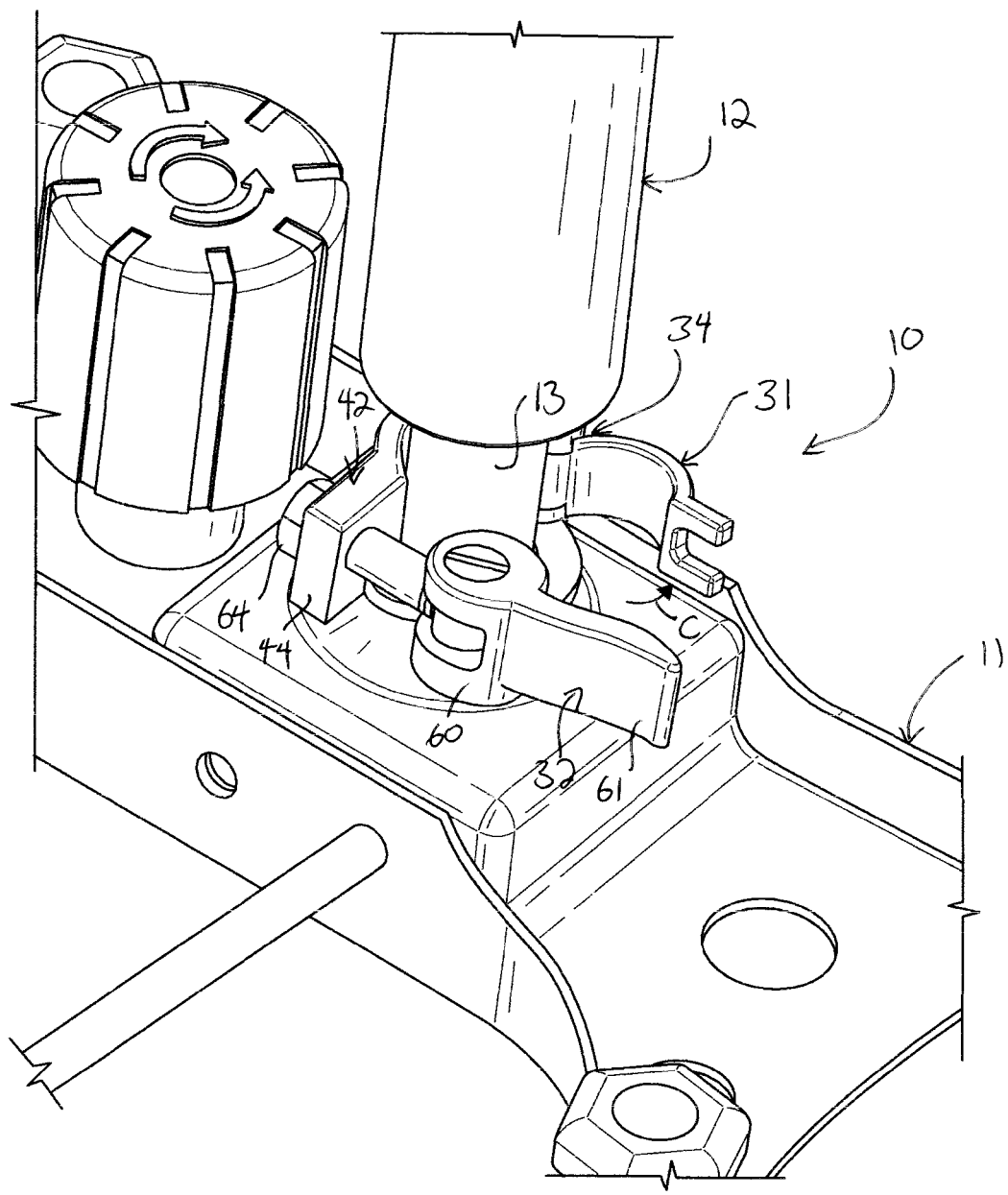

Once the latch 32 is sufficiently loosened from the bolt 64, the clamp 31 can be swung out, pivoted about the hinge 34 along the arcuate arrowed line C in FIG. 5B. The clamp 31 is swung out sufficiently so that it is well away from the rod 13. This releases all compression on the rod 13. In other embodiments, simply moving the latch 32 into the open position is sufficient to release the compression on the rod 13, and it is not necessary to swing the clamp 31 out.

Figure 5C:
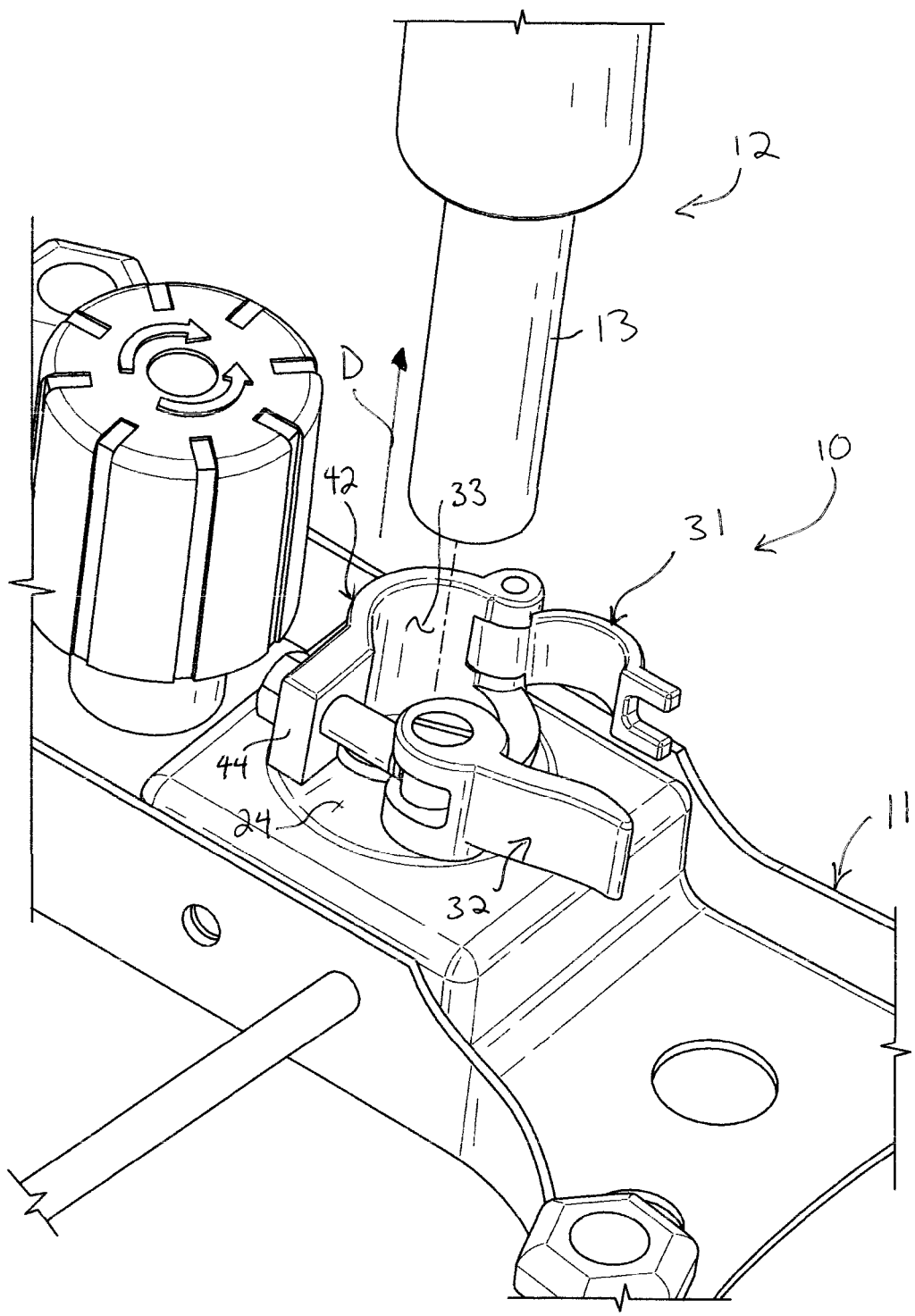

Finally, the entire gas cylinder 12 can be pulled away from the socket 33, along the line D in FIG. 5C. The gas cylinder 12 is now entirely decoupled from the seat plate 11 so that the chair can be stored separately from the gas cylinder 12 and wheelbase 15.

The pieces of the chair may then be packed and stored or shipped. When the chair is to be re-assembled on site, the steps above are mostly reversed. The gas cylinder 12 is inserted into the socket 33, the chair is preferably returned to its upright position so that the weight of the chair bears the rod 13 of the gas cylinder 12 into the seat plate 11. The clamp 31 of the quick-release device 10 is closed around the rod 13. The latch 32 is then tightened onto the bolt 64, bringing the handle 61 over the end 51 of the clamp 31, and moving the tangs 54 and 55 toward the end 44 of the jaw 42. The handle 61 is moved to the closed position thereof, against the outside of the clamp 31. This tightens the quick-release device 10 about the rod 13. If the quick-release device 10 is too tight or not sufficiently tight, the handle 61 can be opened and spun (or the bolt 64 is spun); this causes the pin 63 to thread in or out on the bolt 64 and will change the tightness of the quick-release device 10 on the gas cylinder 12.

Figure 6:
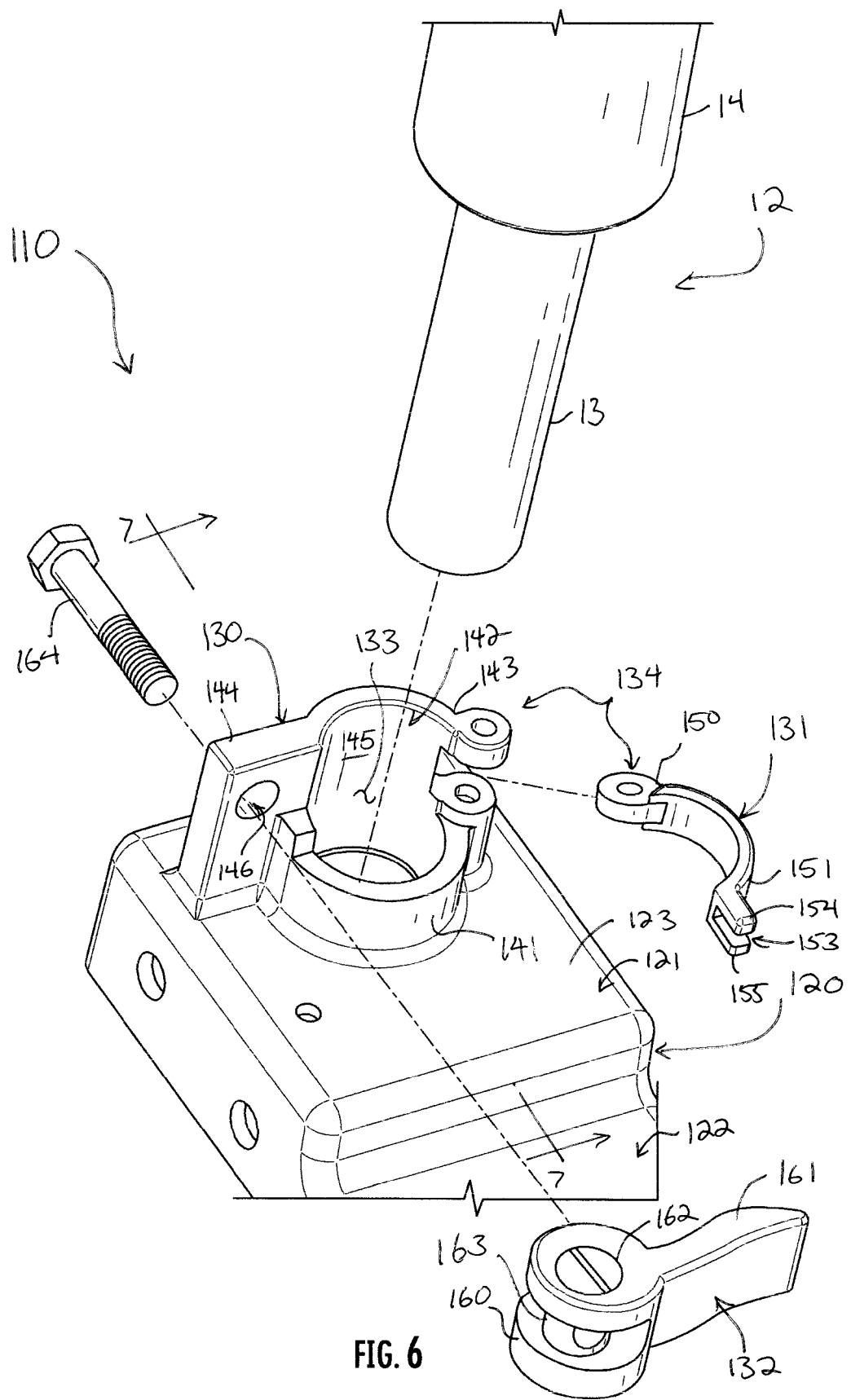
FIG. 6 is an inverted, bottom perspective view of an embodiment of a quick-release device with a gas cylinder assembly.

FIG. 6 is an exploded view of a quick-release device 110 (also referred to herein simply as "the device 110") which can be secured to a seat plate 11 of chair of the kind shown in FIG. 1. In FIG. 6, the seat bottom and back of the chair are removed, as is the seat plate 11, for clarity of the illustration. As before, the remainder of this specification describes a chair for convenience of the explanation, but a chair is just one exemplary device on which the device 110 is suitable for use; it can also be used with any device which incorporates a gas cylinder similar to the gas cylinder 12. The device 110 is similar in many ways to the device 10.

A base 120 is carried within the seat plate 11. Referring now also to the section view of FIG. 7, the base 120 is generally box-shaped; it includes a lower box 121 and a smaller upper box 122. Both the upper and lower boxes 121 and 122 have fronts and backs, and sides which may be disposed against the sides of the seat plate 11. The upper box 122 also has a generally flat top 123.

The quick-release device 110 is a clamp having jaws useful for clamping onto the gas cylinder 12. The device 110 includes a roughly cylindrically-shaped pedestal 130, a clamp 131 pivoted to the pedestal 130 at a hinge 134, and a latch 132 secured over the clamp 131. The pedestal 130 and the clamp 131 are jaws, and the clamp 131 moves between closed and option conditions of the device 110. In the closed position of the clamp 131—and thus the closed condition of the quick-release device 110—the pedestal 130 and the clamp 131 bound and define an interior space or socket 133 into which the gas cylinder 12 is placed. The latch 132 mounted to the pedestal 130 to releasably couple, close, and tighten the clamp 131 with respect to the pedestal 130, so as to arrange the quick-release device 110 between the unlocked and locked conditions.

The pedestal 130 projects upwardly from the top 123 of the base 120 to a top end 140 of the pedestal 130. The top end 140 may be considered a first end and the bottom end of the pedestal 130, formed to the top 123, may be considered a second end. Proximate the top end 140, the pedestal 130 includes a jaw 142. The jaw 142 has a roughly semi-cylindrical sidewall with opposed ends 143 and 144. The end 143 is a knuckle forming a portion of the hinge 134. The opposed end 144 is flat, having a medial hole 146 extending longitudinally through the end 144. Below the jaw 142 is a short stem or cylinder 141, extending completely around and defining the lower portion of the socket 133. The cylinder 141 is below jaw 142 and opposite from the jaw 142, below the clamp 131. The cylinder 141 is the base of the pedestal 130 and is formed monolithically and integrally to the top 123. The cylinder 141 encircles a central hole 147 formed in the top 123, at the geometric center of the cylinder 141 on the top 123. The central hole 147 is registered with a pin 148 on the gas cylinder 12 which enables and disables translation of the rod 13 within the sleeve 12.

The jaw 142 includes an inner surface 145 which is arcuate and defines an inner diameter of the jaw 142. The inner diameter of the jaw 142 is just slightly less than the outer diameter of the rod 13. The inner diameter of the cylinder 141 corresponds to the outer diameter of the rod 13. As such, when the quick-release device 110 is moved into the closed condition around the rod 13, the outer diameter of the rod 13 is tightly received in contact against the inner surface 145 of the jaw 142.

The clamp 131 is pivoted to the jaw 142. The clamp 131 has opposed ends 150 and 151. The end 150 is a knuckle forming the portion of the hinge 134 complemental to the knuckled end 144 of the jaw 142, and the end 151 is a free end. A pin 152 is passed through bores formed through the ends 143 and 150 to bind the knuckled ends 143 and 150 of the jaw 142 and the clamp 131 to each other and form the hinge 134.

The clamp 131 has a roughly semi-cylindrical sidewall extending from the end 150 to the end 151. The end 151 is forked, having a medial slot 153 extending longitudinally into the clamp 131. The slot 153 receives the latch 132 to close the clamp 131 to the jaw 142. The slot 153 severs the free end 152 into opposed upper and lower tangs 154 and 155. The clamp 131 includes an inner surface 56 which is arcuate and defines an inner diameter of the clamp 131. The inner diameter of the clamp 131 is just slightly smaller than the outer diameter of the rod 13. As such, when the quick-release device 110 is moved into the closed condition around the rod 13, the outer diameter of the rod 13 is tightly received in contact against the inner surface 56 of the clamp 131. Further, when the clamp 131 is in the closed position thereof, the tangs 154 and 155 confront or are brought close to the end 144 of the jaw 142.

The clamp 131 is secured by the latch 132 coupled to the jaw 142. The latch 132 includes a cam 160 and a handle 161 formed integrally and monolithically to the cam 160, but extending away from the cam 160. The cam 160 and handle 161 together define the latch 132. The cam 160 is formed with a bore 162 extending entirely through the cam 160 transverse to the handle 161. The bore 162 holds a pin 163, about which the cam 160 and handle 161 are mounted for rotation. The bore 162 is eccentrically disposed in the cam 160; that is, the bore 162 is offset with respect to the geometric center of the cam 160.

The pin 163 has a threaded hole 65 to which the end of a bolt 164 is mounted with a threaded engagement. The bolt 164 is passed through the hole 146 in the end 144 of the jaw 142 and is prevented from passing through the hole 146 in a forward direction by an enlarged head of the bolt 164. The pin 163 can be rotated in one direction or another to thread the pin 163 more or less onto the bolt 164 and thereby translate the pin 163 down or up the bolt 164 slightly, so as to change the effective length of the bolt 164 slightly. With the pin 163 mounted on the bolt 164, the cam 160 and the handle 161 pivot with respect to the bolt 164 through a wide range of movement.

Because the bore 162 of the cam 160 is eccentrically formed, the cam 160 itself is an eccentric: as the handle 161 is rotated about the pin 163, the cam presents 160 a lesser or greater wall thickness along the direction of the bolt 164. In other words, as the handle 161 rotates, pin 163 is moved slightly closer to or further from the pin 163, shortening an effective length of the bolt 164 with which the clamp 131 can be captured. When the clamp 131 is in the closed position, the bolt 164 is passed through the slot 154 between the tangs 154 and 155 and is captured therein.

The base 120 has an underside 124. A cap 183 is secured in the underside 124 below the pedestal 130. A channel 1187 is formed into the underside 124, and the cap 183 is snug fit into the channel 1187 and preferably welded, adhered, or otherwise fixed and secured in the channel 1187. The cap 183 includes an endwall 184 and an annular upstanding sidewall 185 projecting above the endwall 184. A central hole 186 is formed at or near the geometric center of the endwall 184. The top of the sidewall 185 is secured in the channel 1187. The underside 124 and the sidewall 185 and endwall 184 of the cap 183 cooperate to define a hold 187 within the cap 183.

A button 190 is carried within the hold 187. The button 190 is an extension to engage the gas cylinder 12. The button 190 includes a central cylindrical shank 191 with opposed upper and lower ends 192 and 193. A thin flange 194 projects radially outward from the shank 191 at the upper end 192 thereof. The flange 194 has an outer diameter corresponding to the inner diameter of the central hole 147, such that button 190 fits snugly within the central hole 147. Likewise, the lower end 193 of the button 190 is cylindrical and has an outer diameter corresponding to the central hole 186 in the endwall 184 of the cap 183, such that the lower end 193 is sized and shaped to translate into and out of the central hole 186. The button 190 is thus carried in the hold 187 for reciprocation between an advanced position and a retracted position. In some embodiments, the flange 194 may be thicker or there may be a second flange to prevent the button 190 from tilting within the collar 80 during reciprocation. In the retracted position, the lower end 193 passes through and projects out of the central hole 186 in the endwall 184 of the cap 183, where it is available to be depressed by a lever 96 (shown in FIG. 8A). The lever 96 projects over to the side of the chair so that it can be grabbed by the chair's user and manipulated to alter the height of the seat. When the lever 96 is pressed against the lower end 193 of the button 190, the button 190 translates upward and the upper end 192 projects through the central hole 147 in the top 123 of the base 120. Gas cylinders similar to the gas cylinder 12 often include a button or pin 195 at the end of the rod 13 which enables and disables translation of the rod 13 within the sleeve 14. When the button 190 translates upward it impacts the pin 195, so that the rod 13 may be moved within the sleeve 14. Therefore, the button 190 acts as an extension to the pin 195 to enable and disable translation of the rod 13.

Figure 7:
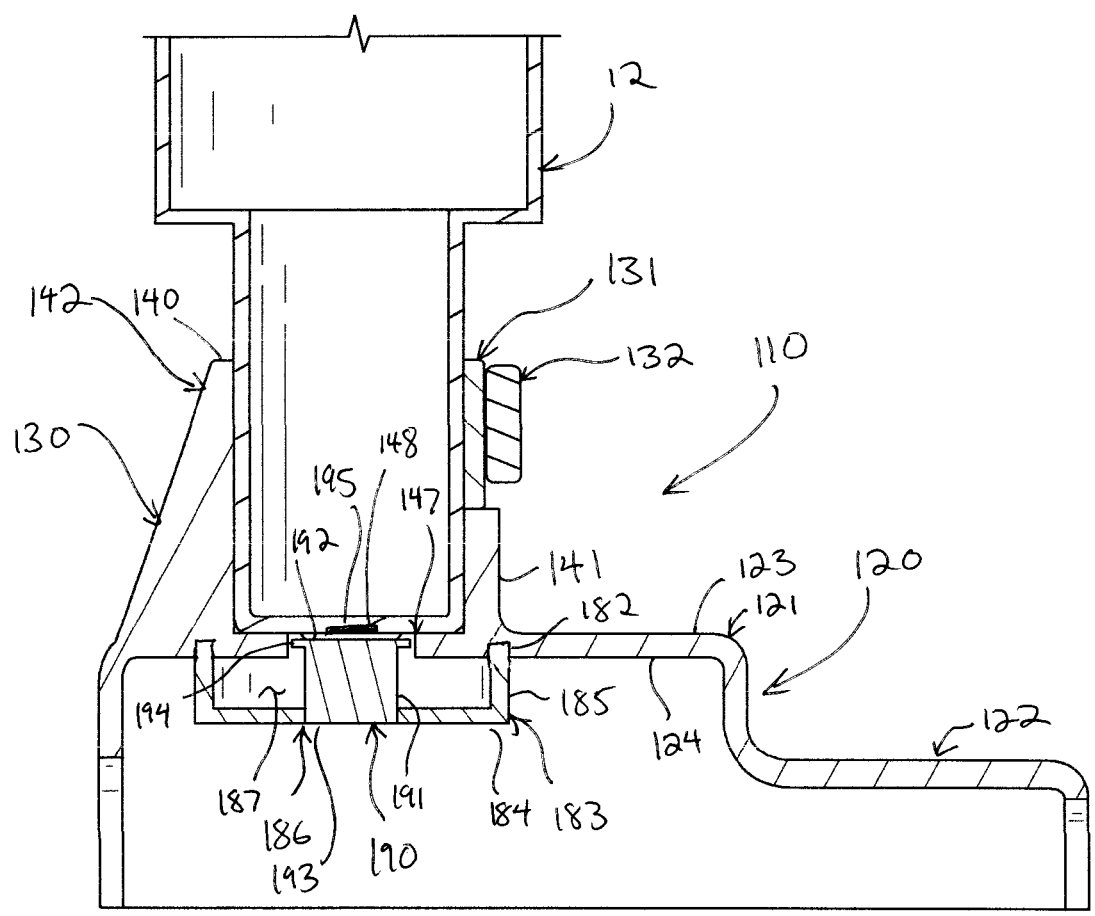
FIG. 7 is a section view taken along the line 7-7 in FIG. 6.

In operation, the quick-release device 110 is useful to securely secure the gas cylinder 12 with respect to the socket 133. The quick-release device 110 can be opened to remove the gas cylinder 110 from the socket 133 when the chair, table, or furniture item is ready to be packed up and transported. FIGS. 6 and 7 illustrate the device 110 in a closed condition. The following discussion describing how to remove the quick-release device 110 is made with respect to FIGS. 7-8C.

FIG. 7 shows the pedestal 130 applied to the socket 133, with the latch 132 and the quick-release device 110 in the closed condition. The handle 161 of the latch 132 is directed along the outer surface of the clamp 131. In this position of the handle 161, the cam 160 pushes the tangs 154 and 155 of the clamp 131 toward the end 144 of the jaw 142. Because the jaw 142 is fixed as part of the pedestal 130, and because the clamp 131 pivots with respect to the jaw 142 about the hinge 134, placing the handle 161 into the closed position moves the clamp 131 toward the jaw 142. Again, this is because the cam 160 is an eccentric: as the handle 161 is moved into the closed position, the cam 160 rotates to present a greater wall thickness along the direction of the bolt 164. This shortens the effective length of the bolt 164, that is, the length of the bolt 164 from the end 144 of the jaw 142 onto which the free end 151 of the clamp 131 can be fit. This draws the clamp 131 closer to the jaw 142, thereby constricting the quick-release device 110 about the rod 13 of the gas cylinder 12. Because the jaw 142 and clamp 131 have inner diameters just slightly less than the outer diameter of the rod 13, this clamps the gas cylinder 12 tightly into the device 110. With the pedestal 130 secured monolithically and integrally to the base 120, and the rod 13 secured by the quick-release device 110 to the pedestal 130, the gas cylinder 12 is firmly secured in the base 120.

To remove the gas cylinder 12 from the seat plate 11, the chair, table, or furniture item is inverted. Then, and with reference to FIG. 8A, the handle 161 is taken up, such as by hand, and moved away from the clamp 131, along the pivotal direction of the arcuate arrowed line A' in FIG. 8A. Pivoting the handle 161 about the pin 163 at the end of the bolt 164 allows the tangs 154 and 155 at the end 151 of the clamp 131 to move slightly away from the end 144 of the jaw 142. This loosens the jaw 142 and the clamp 131 with respect to the rod 13. The handle 161 is moved until it is at least aligned with the bolt 164. At this position of the handle 161, the latch 132 can be rotated on the threaded end of the bolt 164.

Figure 8A:
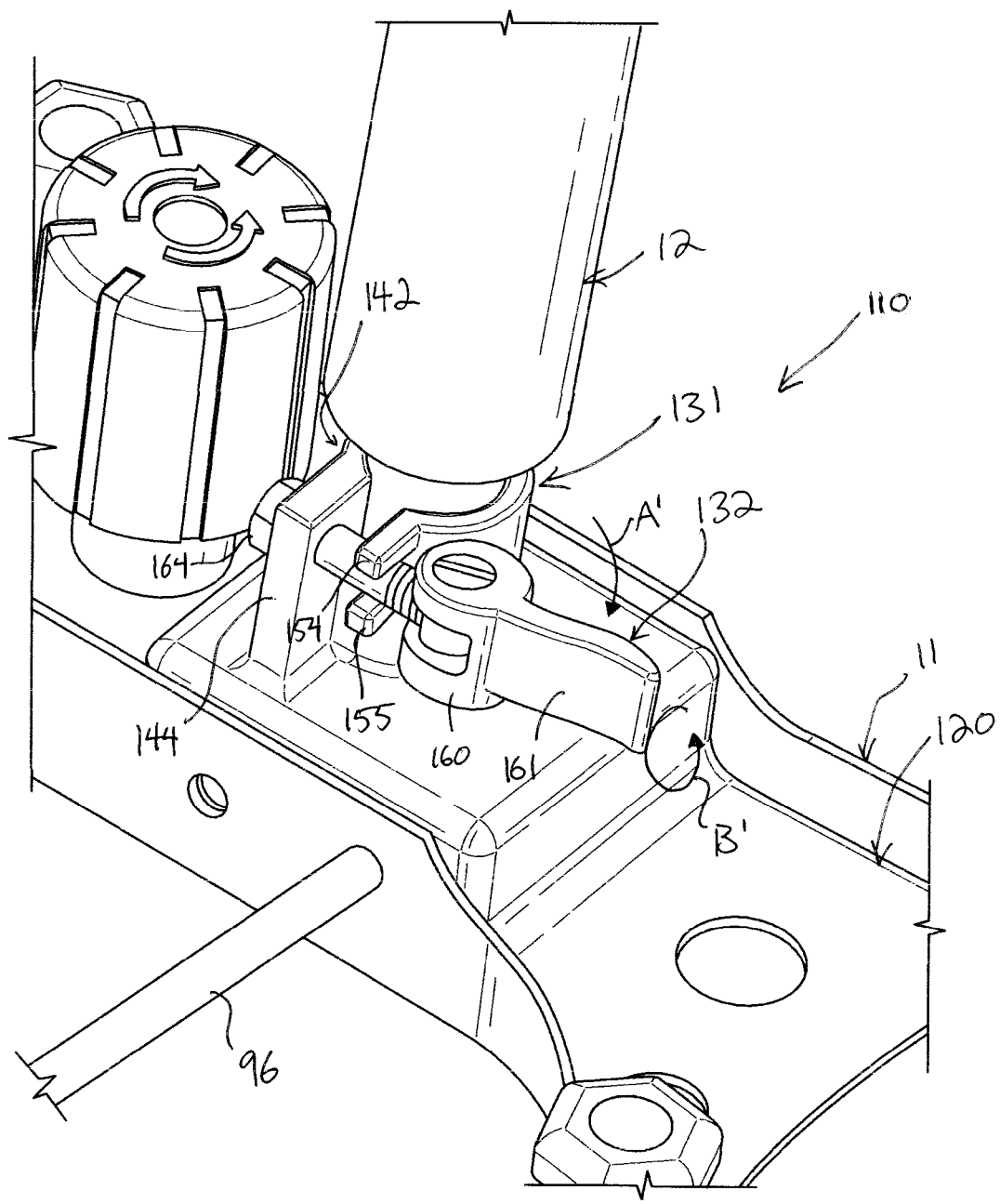
FIGS. 8A-8C are perspective views showing steps of removing the gas cylinder assembly from the quick-release device of FIG. 6.

The latch 132 is rotated counter-clockwise along the circular line B' in FIG. 8A (or the bolt 164 is rotated clockwise while the latch 132 is held stationary), causing the pin 163 in the cam 160 to threadably disengage from the threaded end of the bolt 164. This increases the effective length of the bolt 164 and allows the clamp 131 to move further away from the jaw 142. The latch 132 is loosened until the clamp 131 can be swung out; in some cases this may require that the latch 132 be completely removed from the bolt 164. In other embodiments, the bolt 164 is pivoted within the end 144 of the clamp 142 and can be pivoted away from the rod 13 to move the latch 161. In still other embodiments, it is only necessary to swing the latch 132 out along line 132 to release the compression of the jaw 31 against the rod 13, and it is not necessary to loosen the latch 132 by spinning it.

Figure 8B:
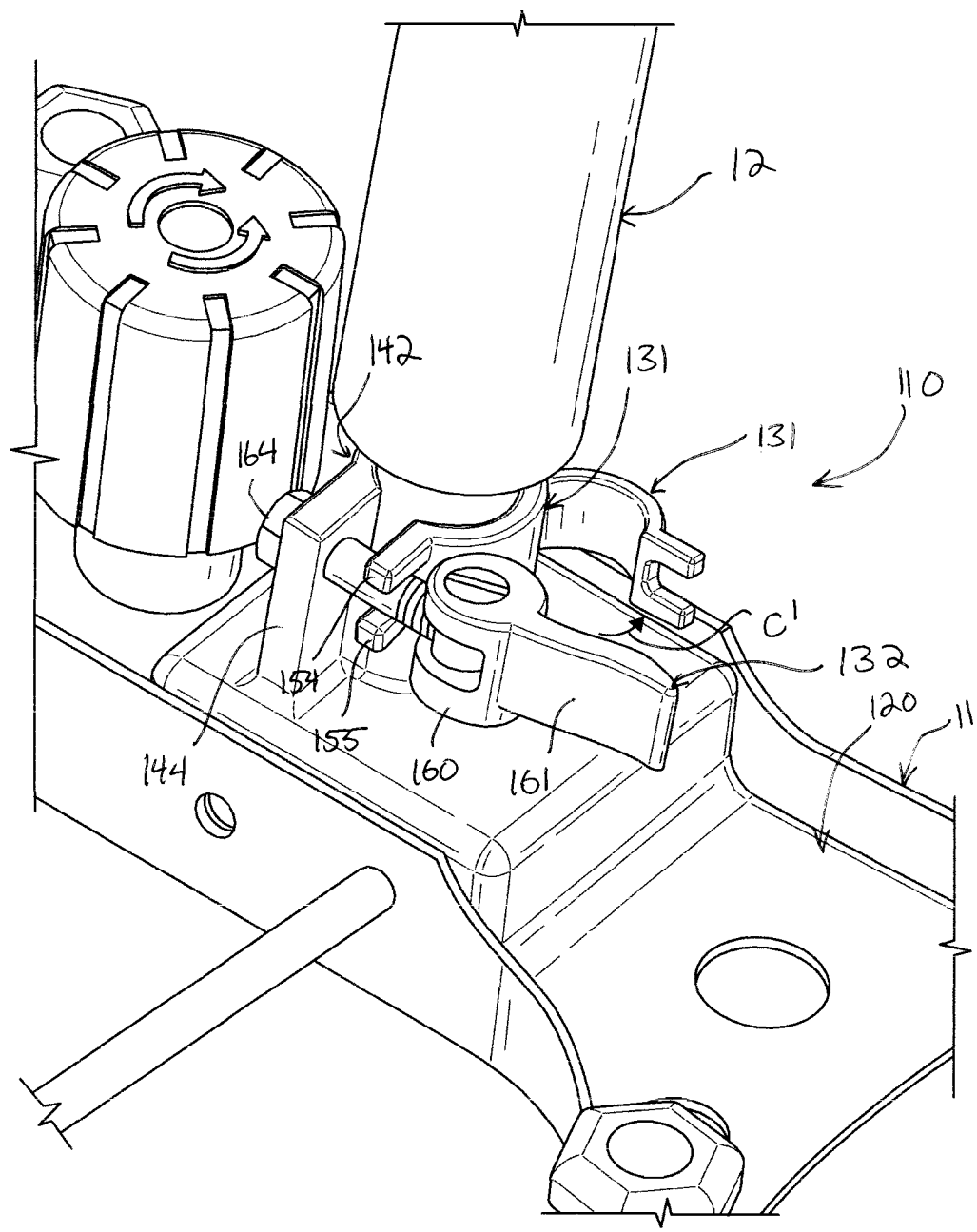

Once the latch 132 is sufficiently loosened from the bolt 164, the clamp 131 can be swung out, pivoted about the hinge 134 along the arcuate arrowed line C' in FIG. 8B (FIG. 8B shows both positions of the clamp 131, before and after it is swung out). The clamp 131 is swung out sufficiently so that it is well away from the rod 13. This releases all compression on the rod 13. In other embodiments, simply moving the latch 132 into the open position is sufficient to release the compression on the rod 13, and it is not necessary to swing the clamp 131 out.

Figure 8C:
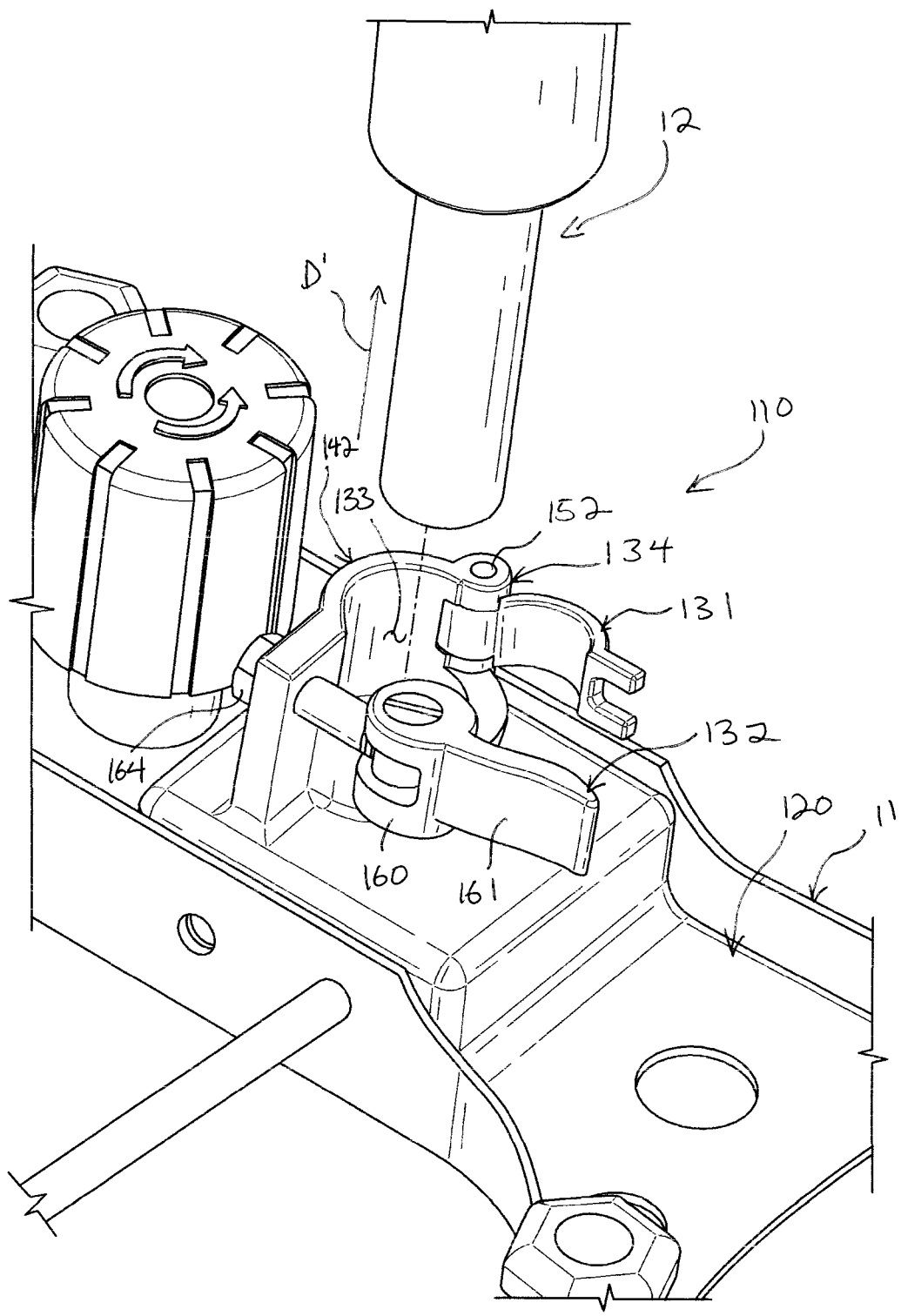

Finally, the entire gas cylinder 12 can be pulled away from the socket 133, along the line D' in FIG. 8C. The gas cylinder 12 is now entirely decoupled from the base 10 so that the chair can be stored separately from the gas cylinder 12 and wheelbase 15.

The pieces of the chair may then be packed and stored or shipped. When the chair is to be re-assembled on site, the steps above are mostly reversed. The gas cylinder 12 is inserted into the socket 133, the chair is preferably returned to its upright position so that the weight of the chair bears the rod 13 of the gas cylinder 12 into the seat plate 11. The clamp 131 of the quick-release device 110 is closed around the rod 13. The latch 132 is then tightened onto the bolt 164, bringing the handle 161 over the end 151 of the clamp 131, and moving the tangs 154 and 155 toward the end 144 of the jaw 142. The handle 161 is moved to the closed position thereof, against the outside of the clamp 131. This tightens the quick-release device 110 about the rod 13. If the quick-release device 110 is too tight or not sufficiently tight, the handle 161 can be opened and spun (or the bolt 164 is spun); this causes the pin 163 to thread in or out on the bolt 164 and will change the tightness of the quick-release device 110 on the gas cylinder 12.

A preferred embodiment is fully and clearly described above so as to enable one having skill in the art to understand, make, and use the same. Those skilled in the art will recognize that modifications may be made to the description above without departing from the spirit of the specification, and that some embodiments include only those elements and features described, or a subset thereof. To the extent that modifications do not depart from the spirit of the specification, they are intended to be included within the scope thereof.

What is claimed is:

1. A quick-release device for securing a gas cylinder in a seat plate, comprising:
   a pedestal defining a socket for receiving the gas cylinder, the pedestal projecting upwardly from an endwall to form a jaw against which the gas cylinder is received when applied to the socket;
a clamp pivoted to the jaw for movement between an open position and a closed position;
a flange formed in the pedestal, wherein the flange has a lower surface for confrontation with the seat plate; and
a latch coupled to the pedestal, which latch moves between a first position enabling movement of the clamp between the open and closed positions, and a second position disabling movement of the clamp between the open and closed positions.

2. The quick-release device of claim 1, wherein the clamp is pivoted to the pedestal above the flange.

3. The quick-release device of claim 1, wherein the endwall of the pedestal comprises a central hole formed through the endwall at a geometric center thereof.

4. The quick-release device of claim 1, wherein the latch comprises a cam and a handle extending therefrom.

5. The quick-release device of claim 1, further comprising a bolt carried in the jaw, wherein the latch is coupled to the bolt to move in pivotal movement between the first and second positions.

6. The quick-release device of claim 1, wherein the pedestal further comprises a stem below the flange, the stem configured to be inserted into the seat plate to be secured therein.

7. The quick-release device of claim 1, wherein:
in the closed position of the clamp, and when the gas cylinder is received in the socket, the clamp bears the gas cylinder in confrontation against the jaw; and
in the open position of the clamp, and when the gas cylinder is received in the socket, the clamp releases the gas cylinder from confrontation against the jaw.

8. A quick-release device for securing a gas cylinder in a seat plate, comprising:
a pedestal including a cylindrical stem and a semi-cylindrical jaw projecting above the stem, and a socket defined therein to receive the gas cylinder, wherein the pedestal projects upwardly from an endwall, and the endwall comprises a central hole formed through the endwall at a geometric center thereof;
a clamp pivoted to the jaw for movement between an open position and a closed position;
a latch coupled to the pedestal, which latch moves between a first position enabling movement of the clamp between the open and closed positions, and a second position disabling movement of the clamp between the open and closed positions;
wherein in the closed position of the clamp, and when the gas cylinder is received in the socket, the clamp bears the gas cylinder in confrontation against the jaw; and
in the open position of the clamp, and when the gas cylinder is received in the socket, the clamp releases the gas cylinder from confrontation against the jaw.

9. The quick-release device of claim 8, further comprising a flange formed in the pedestal, wherein the flange has a lower surface for confrontation with the seat plate.

10. The quick-release device of claim 9, wherein the clamp is pivoted to the pedestal above the flange.

11. The quick-release device of claim 9, wherein the stem is configured to be inserted into the seat plate to be secured therein.

12. The quick-release device of claim 8, wherein the latch comprises a cam and a handle extending therefrom.

13. The quick-release device of claim 8, further comprising a bolt carried in the jaw, wherein the latch is coupled to the bolt to move in pivotal movement between the first and second positions.

14. A quick-release device for securing a gas cylinder in a seat plate, comprising:
a pedestal defining a socket for receiving the gas cylinder, the pedestal projecting upwardly to form a jaw against which the gas cylinder is received when applied to the socket, wherein the pedestal projects upwardly from an endwall, and the endwall comprises a central hole formed through the endwall at a geometric center thereof;
a clamp pivoted to the jaw for movement between an open position and a closed position; and
a latch coupled to the pedestal, which latch moves between a first position enabling movement of the clamp between the open and closed positions, and a second position disabling movement of the clamp between the open and closed positions.

15. The quick-release device of claim 14, wherein the pedestal is formed monolithically to a base, the base configured to be received in the seat plate.

16. The quick-release device of claim 15, wherein the pedestal further comprises a cylinder projecting upward from the base to the jaw and to below the clamp pivoted to the jaw.

17. The quick-release device of claim 14, wherein the latch comprises a cam and a handle extending therefrom.

18. The quick-release device of claim 14, further comprising a bolt carried in the jaw, wherein the latch is coupled to the bolt to move in pivotal movement between the first and second positions.

* * * * *